United States Patent
Ota et al.

(10) Patent No.: US 11,675,247 B2
(45) Date of Patent: Jun. 13, 2023

(54) BROADBAND PULSED LIGHT SOURCE APPARATUS, SPECTROSCOPIC MEASUREMENT APPARATUS, AND SPECTROSCOPIC MEASUREMENT METHOD

(71) Applicant: Ushio Denki Kabushiki Kaisha, Tokyo (JP)

(72) Inventors: Aya Ota, Tokyo (JP); Toshikazu Nagashima, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 17/593,879

(22) PCT Filed: Mar. 25, 2020

(86) PCT No.: PCT/JP2020/013497
§ 371 (c)(1),
(2) Date: Sep. 27, 2021

(87) PCT Pub. No.: WO2020/196688
PCT Pub. Date: Oct. 1, 2020

(65) Prior Publication Data
US 2022/0155221 A1    May 19, 2022

(30) Foreign Application Priority Data
Mar. 27, 2019 (JP) ............... JP2019-062008

(51) Int. Cl.
G02F 1/35 (2006.01)
G02F 1/365 (2006.01)

(52) U.S. Cl.
CPC ............ *G02F 1/365* (2013.01); *G02F 1/3528* (2021.01)

(58) Field of Classification Search
CPC ............................... G02F 1/365; G02F 1/3528
(Continued)

(56) References Cited

U.S. PATENT DOCUMENTS 11,268,855 B2 * 3/2022 Nagashima ............ G01J 3/0218
2001/0051031 A1 * 12/2001 Hada ................... G02B 6/29376
398/147

(Continued)

FOREIGN PATENT DOCUMENTS

JP    2012203036 A    10/2012
JP    2012215696 A    11/2012
(Continued)

OTHER PUBLICATIONS

"Measurement and compensation of residual group delay in a multi-core fiber for lensless endoscopy" by Andresen et al, Journal of the Optical Society of America B, vol. 32, No. 6, pp. 1221-1228 (Year: 2015).*
(Continued)

*Primary Examiner* — Robert Tavlykaev
(74) *Attorney, Agent, or Firm* — Buchanan Ingersoll & Rooney PC

(57) ABSTRACT

A stretching fiber module that stretches a pulse width of the broadband pulsed light from a broadband pulsed light source such that a time and a wavelength in a pulse correspond to each other on a one-to-one basis includes a multicore fiber and single-core compensation fibers coupled to cores of the multicore fiber. The compensation fibers compensate for a variation in wavelength dispersion characteristic between the cores of the multicore fiber and are temperature-controlled by a temperature adjuster.

11 Claims, 13 Drawing Sheets

(58) Field of Classification Search
USPC .................................................... 385/5, 122
See application file for complete search history.

(56) References Cited

U.S. PATENT DOCUMENTS

| | | | |
|---|---|---|---|
| 2007/0273945 A1* | 11/2007 | Furman | H01L 22/12 |
| | | | 359/107 |
| 2014/0233091 A1* | 8/2014 | Clowes | H01S 3/06754 |
| | | | 359/341.1 |
| 2016/0240997 A1 | 8/2016 | Zach et al. | |
| 2017/0122806 A1 | 5/2017 | Capelle et al. | |
| 2020/0166406 A1* | 5/2020 | Ota | G01N 21/31 |

FOREIGN PATENT DOCUMENTS

| | | |
|---|---|---|
| JP | 2013205390 A | 10/2013 |
| JP | 2016151766 A | 8/2016 |

OTHER PUBLICATIONS

International Search Report (PCT/ISA/210) and Written Opinion (PCT/ISA/237) both with English translations dated Jun. 30, 2020, by the Japan Patent Office as the International Searching Authority for International Application No. PCT/JP2020/013497.

* cited by examiner

FIG. 5
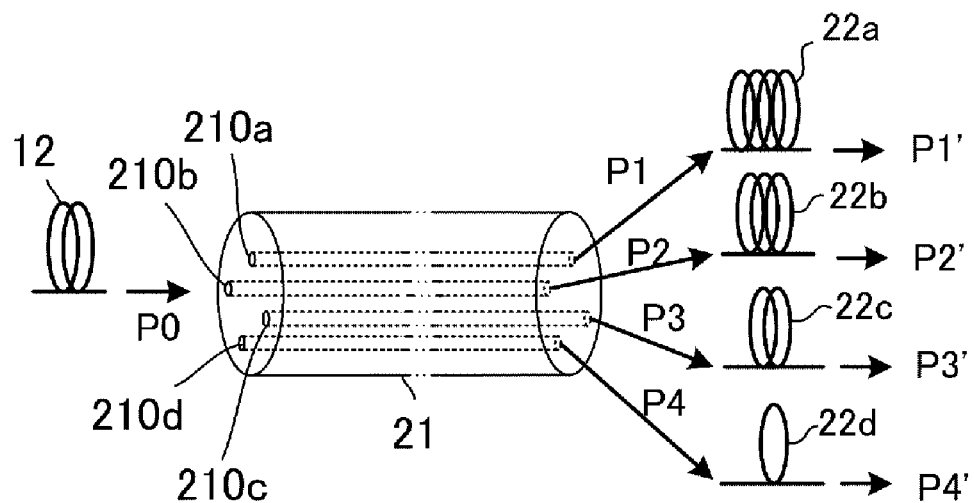
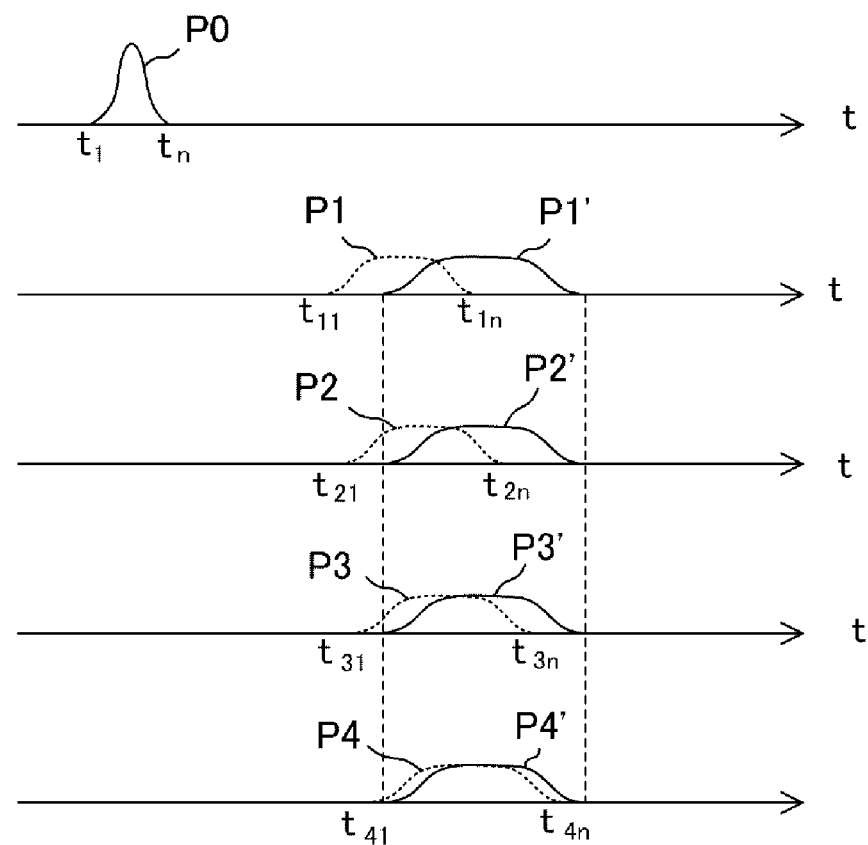

FIG. 6 (1)
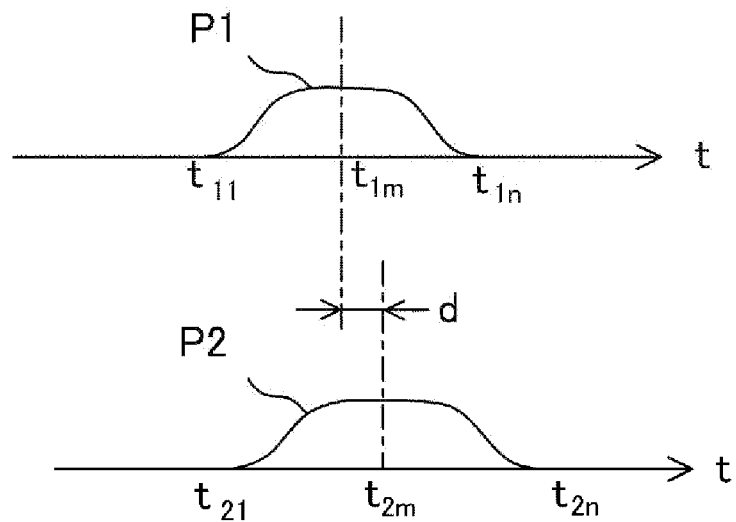
FIG.6 (2)
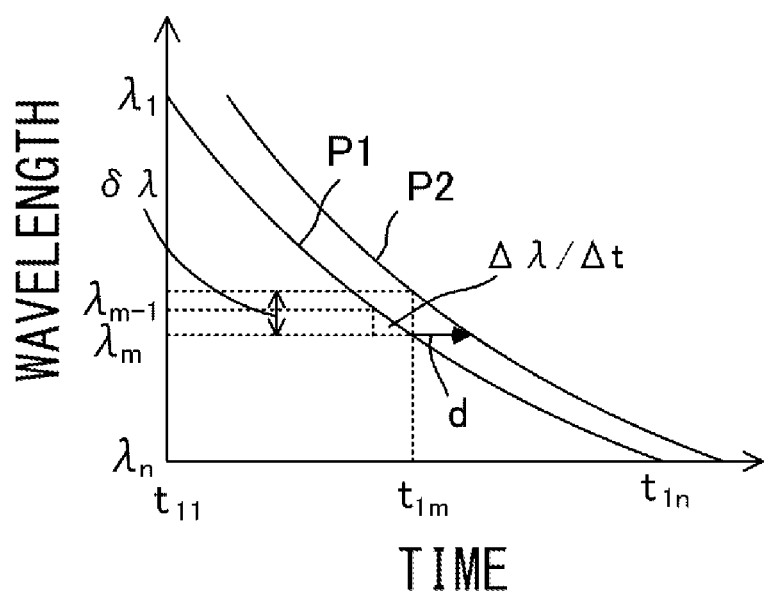

FIG. 8 (1)
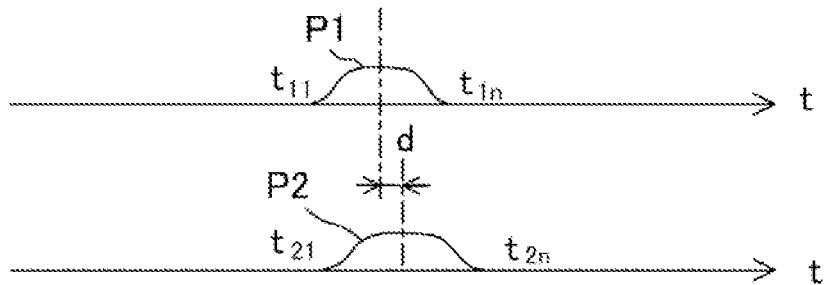
FIG. 8 (2)
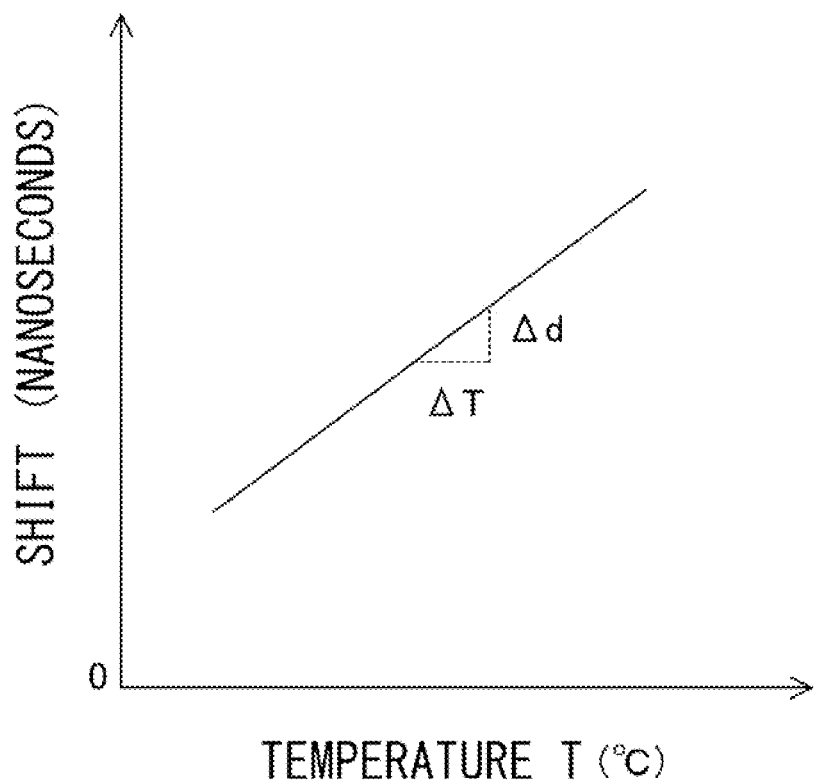

FIG. 13

| INTRA-PULSE TIME | WAVELENGTH | REFERENCE SPECTRUM DATA | MEASUREMENT VALUE | ABSORPTION SPECTRUM |
|---|---|---|---|---|
| $t_1$ | $\lambda_1$ | $V_1$ | $v_1$ | $v_1/V_1$ |
| $t_2$ | $\lambda_2$ | $V_2$ | $v_2$ | $v_2/V_2$ |
| $t_3$ | $\lambda_3$ | $V_3$ | $v_3$ | $v_3/V_3$ |
| ... | ... | ... | ... | ... |
| $t_{n-2}$ | $\lambda_{n-2}$ | $V_{n-2}$ | $v_{n-2}$ | $v_{n-2}/V_{n-2}$ |
| $t_{n-1}$ | $\lambda_{n-1}$ | $V_{n-1}$ | $v_{n-1}$ | $v_{n-1}/V_{n-1}$ |
| $t_n$ | $\lambda_n$ | $V_n$ | $v_n$ | $v_n/V_n$ |

BROADBAND PULSED LIGHT SOURCE APPARATUS, SPECTROSCOPIC MEASUREMENT APPARATUS, AND SPECTROSCOPIC MEASUREMENT METHOD

BACKGROUND

1. Technical Field

The present disclosure relates to a light source apparatus that emits broadband pulsed light, and also relates to an apparatus and a method for measuring a spectral characteristic of an object using broadband pulsed light.

2. Description of the Related Art

A typical pulsed light source is a pulse oscillation laser (pulsed laser). In recent years, research to broaden the wavelength of the pulsed laser has been actively conducted, and a typical example thereof is generation of super continuum light (hereinafter, referred to as SC light) using a nonlinear optical effect. The SC light is light obtained by passing light from a pulse laser source through a nonlinear element such as a fiber and broadening the wavelength by a nonlinear optical effect such as self-phase modulation or optical soliton.

The broadband pulsed light described above is broadly extended in a wavelength domain, but the pulse width (time width) remains close to the pulse width of the input pulse used to generate the SC light. However, when a group delay in a transmission element such as a fiber is used, the pulse width can also be stretched. At this time, when an element having an appropriate wavelength dispersion characteristic is selected, pulse stretch can be performed in a state where the time (elapsed time) and the wavelength in the pulse correspond to each other on a one-to-one basis.

The correspondence relationship between the time and the wavelength in the broadband pulsed light pulse-stretched in this manner (hereinafter, referred to as broadband stretched pulsed light) can be effectively used for spectroscopic measurement. In a case where the broadband stretched pulsed light is received by a certain light receiver, a temporal change of the light intensity detected by the light receiver corresponds to the light intensity of each wavelength, that is, a spectrum. Therefore, a temporal change of output data of the light receiver can be converted into a spectrum, and spectroscopic measurement can be performed without using a special dispersive element such as a diffraction grating. That is, by irradiating the object with the broadband stretched pulsed light, receiving light from the object by the light receiver, and measuring the temporal change, the spectral characteristic (for example, spectral transmittance) of the object can be known.

As described above, the broadband stretched pulsed light is particularly useful in the field of spectroscopic measurement and the like. However, according to the research of the inventor, it has been found that when the output of the broadband pulsed light source is increased to radiate stronger light, an unintended nonlinear optical effect occurs in a pulse stretching element, and uniqueness of time and wavelength (one-to-one correspondence) is lost.

SUMMARY

The present disclosure is based on this finding. A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later.

A broadband pulsed light source apparatus according to one embodiment includes: a broadband pulsed light source; and a stretching fiber module structured to stretch a pulse width of the broadband pulsed light from the broadband pulsed light source such that a time and a wavelength of the light in a pulse have a one to one relationship. The stretching fiber module includes a multicore fiber or a bundle fiber and compensation fibers that are single-core fibers, and the compensation fibers are coupled to cores of the multicore fiber or fibers of the bundle fiber, and compensate for a variation in wavelength dispersion characteristic between the cores of the multicore fiber or between the fibers of the bundle fiber.

In addition, in order to solve the above problems, the broadband pulsed light source apparatus may have a configuration in which the compensation fibers are coupled to two or more cores of the multicore fiber or two or more fibers of the bundle fiber.

In addition, in order to solve the above problems, the broadband pulsed light source apparatus may include a temperature adjuster structured to adjust a temperature of each of the compensation fibers.

In addition, in order to solve the above problems, the broadband pulsed light source apparatus may have a configuration of including a monitoring unit structured to detect a shift in timing of emission of the broadband pulsed light emitted from each of the compensation fibers, in which the temperature adjuster is structured to perform temperature adjustment according to an amount of the shift in timing detected by the monitoring unit.

In addition, in order to solve the above problems, the temperature adjuster may be a mechanism structured to operate when the amount of the shift in timing of emission of the broadband pulsed light emitted from each of the compensation fibers is equal to or more than a threshold value.

In addition, in order to solve the above problems, the temperature adjuster may be a mechanism structured to perform temperature adjustment by an amount determined in advance according to the amount of the shift in timing of emission of the broadband pulsed light emitted from each of the compensation fibers.

In addition, in order to solve the above problems, the broadband pulsed light source apparatus may have a configuration of including a length adjustment mechanism structured to adjust a length of each of the compensation fibers.

In addition, in order to solve the above problems, the broadband pulsed light source apparatus may have a configuration in which the stretching fiber module includes a multicore fiber and compensation fibers that are single-core fibers, and the multicore fiber is a single-mode multicore fiber.

In addition, in order to solve the above problems, the broadband pulsed light source apparatus may have a configuration in which the stretching fiber module includes a bundle fiber and compensation fibers that are single-core fibers, and the bundle fiber is a fiber in which single-mode fibers are bundled.

In addition, in order to solve the above problems, the compensation fibers may be single-mode fibers.

In addition, in order to solve the above problems, a spectroscopic measurement apparatus according to the invention of this application includes: the broadband pulsed light source apparatus; a light receiver disposed at a position where light from an object irradiated with broadband pulsed light emitted from the broadband pulsed light source apparatus is incident; and a calculator structured to perform calculation of converting output data from the light receiver into a spectrum.

In addition, in order to solve the above problems, a spectroscopic measurement method according to the invention of this application includes: a step of irradiating an object with broadband pulsed light emitted from the broadband pulsed light source apparatus; a step of receiving, by a light receiver, light from the object irradiated with the light; and a step of converting output data from the light receiver into a spectrum by a calculator.

In one embodiment, since the broadband pulsed light is divided by the multicore fiber or the bundle fiber and pulse-stretched, it is possible to prevent an unintended nonlinear optical effect from occurring during the pulse stretching while achieving a high-output light source apparatus. Since the variation in wavelength dispersion characteristic of the cores is compensated by the compensation fibers, the uniqueness of time to wavelength is accurately maintained when the divided and pulse-stretched light beams are superimposed on each other.

In one embodiment, since the broadband pulsed light source apparatus having the above effects is used, spectroscopic measurement can be performed with light in which the uniqueness of time to wavelength is maintained high. Therefore, the accuracy of spectroscopic measurement is enhanced. In addition, there is no problem that the SN ratio decreases in a specific wavelength region due to the dynamic range. Furthermore, since the light can be radiated with high energy efficiency, there is also an advantage that an object having a large amount of light absorption can be measured with the transmitted light intensity increased.

In one embodiment, when the compensation fiber is coupled to each of two or more cores of the multicore fiber or two or more fibers of the bundle fiber, it is possible to finely adjust the shift in timing of emission of the broadband pulsed light. Therefore, the above effects are further enhanced.

In one embodiment, when the broadband pulsed light source apparatus includes the temperature adjuster structured to adjust a temperature of each of the compensation fibers, it is possible to suppress the shift in timing of emission of the broadband pulsed light due to the variation in wavelength dispersion characteristic of the compensation fibers by temperature adjustment, so that the uniqueness of time to wavelength is more accurately maintained.

In one embodiment, when the monitoring unit structured to detect a shift in timing of emission of the broadband pulsed light emitted from each of the compensation fibers is provided, and the temperature adjuster is structured to perform temperature adjustment according to the shift in timing detected by the monitoring unit, it is possible to suppress the variation in wavelength dispersion characteristic regardless of the temperature change, and in this respect, the accuracy of the uniqueness of time to wavelength is further maintained high.

In one embodiment, when the temperature adjuster is structured to operate when the shift in timing of emission of the broadband pulsed light emitted from each of the compensation fibers is equal to or more than a threshold value, the operation of the temperature adjuster can be minimized, and a device excellent in the energy saving effect is provided.

In one embodiment, when the temperature adjuster is structured to perform temperature adjustment of a predetermined amount according to the shift in timing of emission of the broadband pulsed light emitted from each of the compensation fibers, the adjustment amount according to the shift is easily achieved, and there is no problem that the temperature adjustment is insufficient or excessive.

In one embodiment, when the length adjustment mechanism structured to adjust a length of each of the compensation fibers is provided, it is possible to suppress the variation in wavelength dispersion characteristic at a higher speed than a method involving temperature adjustment.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 5 is a schematic diagram showing lengths of compensation fibers;

FIG. 6(1) and FIG. 6(2) are a schematic diagram showing an allowable value of an amount of a shift of each pulse after compensation by the compensation fiber;

FIG. 8(1) and FIG. 8(2) are a schematic diagram showing control of temperature adjusters in the second embodiment;

FIG. 13 is a schematic diagram showing a configuration of a measurement program included in spectroscopic measurement software.

DESCRIPTION OF EMBODIMENTS

Next, modes (embodiments) for carrying out the invention of this application will be described.

Figure 1:
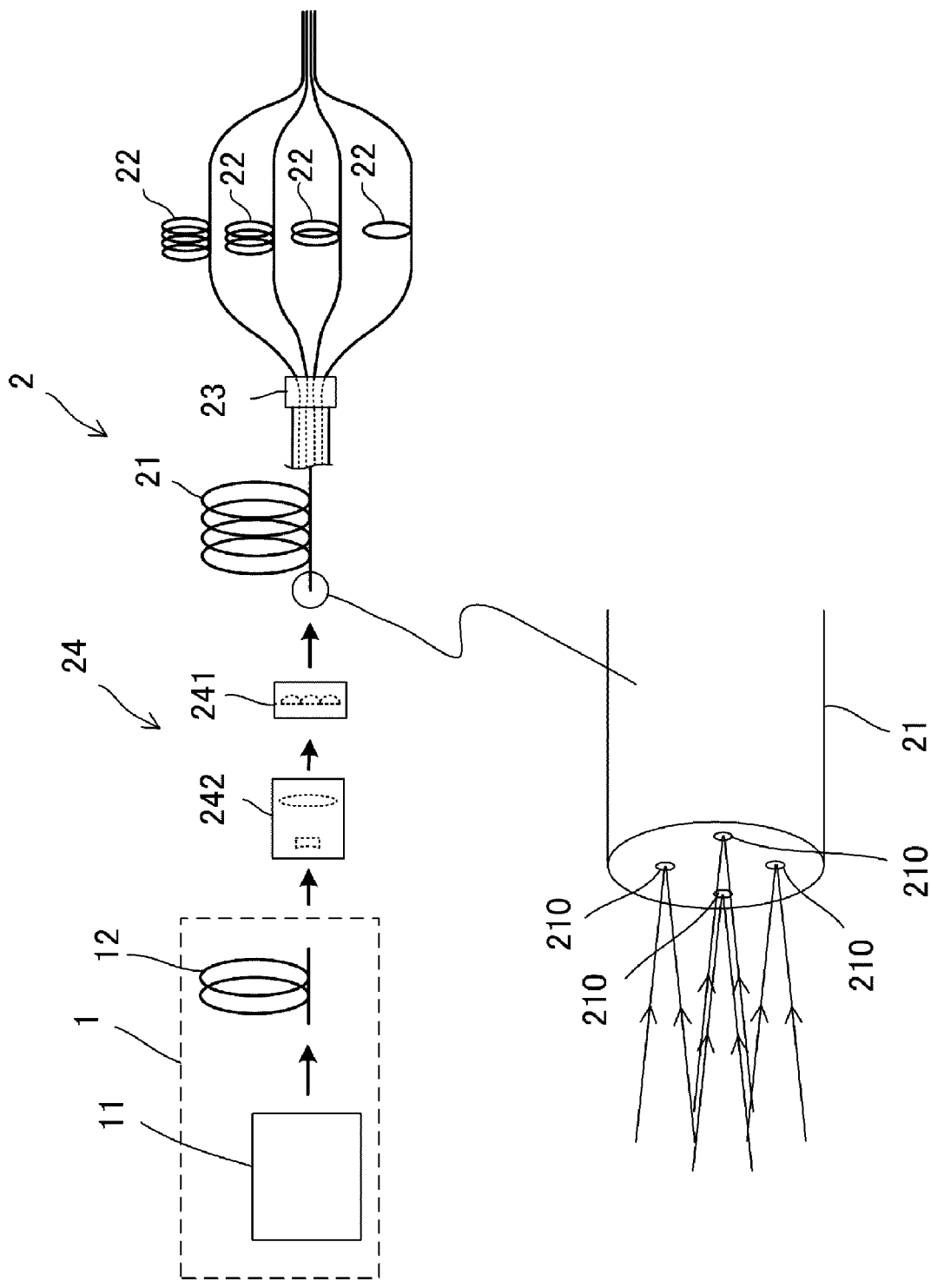
FIG. 1 is a schematic diagram of a broadband pulsed light source apparatus of a first embodiment.

First, embodiments of the invention of a broadband pulsed light source apparatus will be described. FIG. 1 is a schematic diagram of a broadband pulsed light source apparatus of a first embodiment.

The broadband pulsed light source apparatus shown in FIG. 1 includes a broadband pulsed light source 1 that emits broadband pulsed light, and a stretching fiber module 2 that extends a pulse width of the broadband pulsed light emitted from the broadband pulsed light source 1.

As the broadband pulsed light source 1, one that outputs SC light is used in this embodiment. Specifically, the broadband pulsed light source 1 includes a pulse laser source 11 and a nonlinear element 12 on which light from the pulse laser source 11 is incident.

As the pulse laser source 11, various laser sources can be used, and for example, a gain-switched laser, a microchip laser, a fiber laser, or the like can be used. The pulse laser source 11 is desirably an ultrashort pulse laser source to generate SC light due to a nonlinear optical effect.

A fiber is often used for the nonlinear element 12. For example, a photonic crystal fiber or other fibers in which nonlinearity occurs by inputting a pulse can be used as the nonlinear element 12. When the broadband pulsed light source is used for spectroscopic measurement as described later, as a mode of the fiber, a single mode is often used from the viewpoint of measurement stability, but also a multi-mode can be used as the nonlinear element 12 as long as it exhibits sufficient nonlinearity and can obtain expected measurement stability in a measurement wavelength range.

The broadband pulsed light source apparatus of this embodiment is assumed to be used for light measurement such as spectroscopic analysis of a material, and thus broadband pulsed light to be emitted is light in the near-infrared range of about 900 nm to 1300 nm. In addition, a "broadband" spectrum means a continuous spectrum in a certain wavelength width, and this means light having a continuous spectrum over a wavelength width of at least 10 nm, 50 nm, or 100 nm, for example. That is, in this embodiment, the broadband pulsed light source 1 is a light source that emits light having a continuous spectrum over a wavelength width of at least 10 nm, 50 nm, or 100 nm in a range of 900 nm to 1300 nm.

Figure 2:
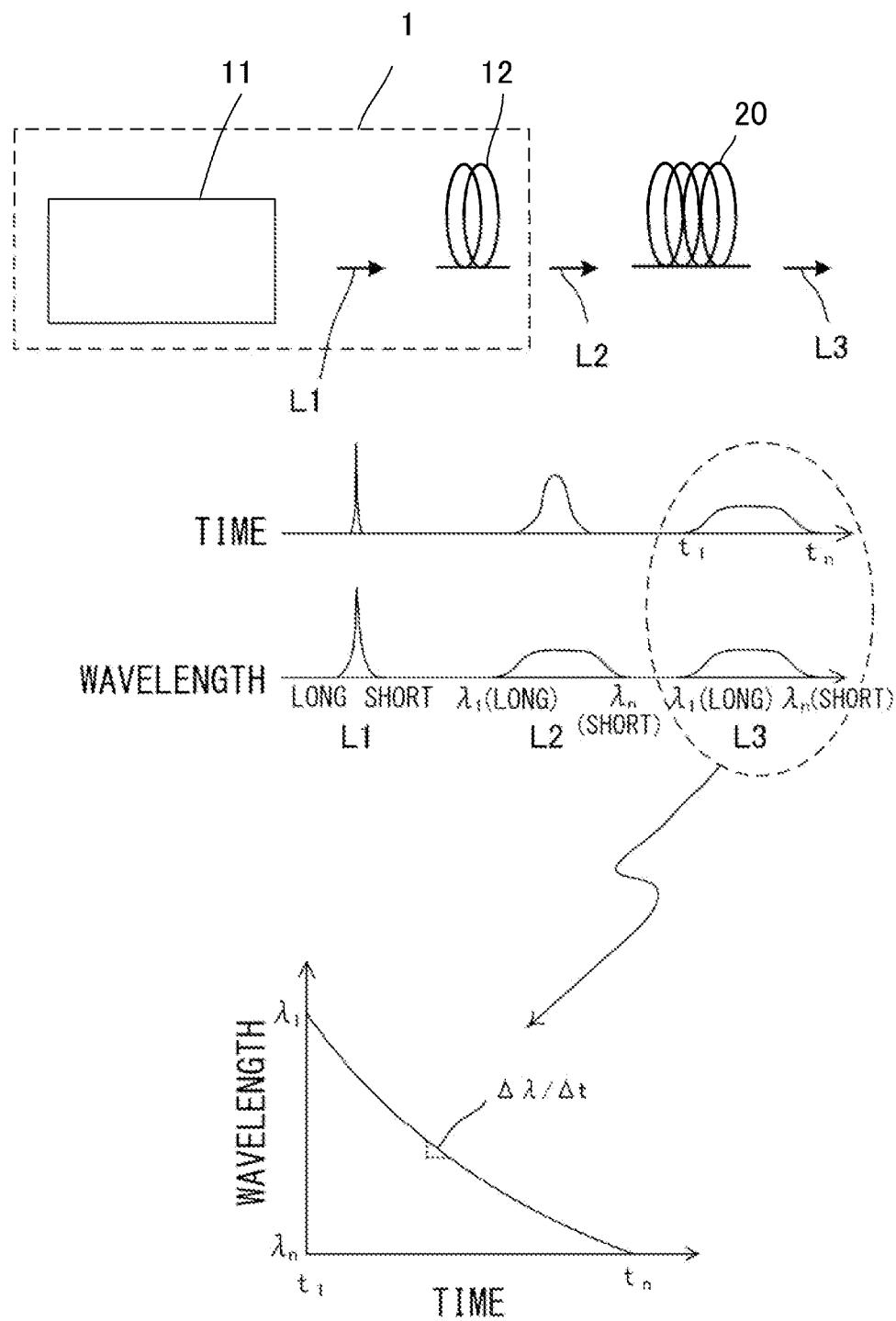
FIG. 2 is a schematic diagram showing pulse stretching of the broadband pulsed light by a fiber.

The stretching fiber module 2 performs pulse stretching by a fiber-based element. As a result of the pulse stretching in the stretching fiber module 2, the pulse width of the pulsed light is stretched and a one-to-one relationship between a time and a wavelength of the light in the broadband stretched pulsed light is produced. FIG. 2 is a schematic diagram showing pulse stretching of broadband pulsed light by the fiber.

When the pulse laser source 11 oscillates, for example, ultrashort pulse laser light L1, the ultrashort pulse laser light L1 is incident on the nonlinear element 12 to generate a nonlinear optical effect, and the ultrashort pulse laser light L1 is emitted as SC light L2 having a continuous spectrum in a certain wavelength region. When the SC light L2 is passed through a fiber for pulse-stretching (normal dispersion fiber) 20 showing a negative dispersion value in the wavelength range, the pulse width is effectively stretched.

That is, as shown in FIG. 2, in the SC light L2, light having a longest wavelength $\lambda_1$ at the beginning of one pulse though it is an ultrashort pulse exists, light having a shorter wavelength gradually exists as time elapses, and light having a shortest wavelength $\lambda_n$ exists at the end of the pulse. When this light is passed through the fiber 20 which is a normal dispersion fiber, in the fiber 20, light having a shorter wavelength propagates with a delay. Therefore, a time difference in one pulse is increased, and when the fiber 20 is emitted, the light having a shorter wavelength is further delayed as compared with light having a longer wavelength. As a result, SC light L3 to be emitted is light having the stretched pulse width in a state where uniqueness of time to wavelength is secured. That is, as shown on the lower side of FIG. 2, in times $t_1$ to $t_n$, pulse stretching is performed in a one-to-one correspondence with the wavelengths $\lambda_1$ to $\lambda_n$.

Therefore, if a time is specified and the light intensity is obtained, it indicates the light intensity (spectrum) of the wavelength corresponding to the time. This means that spectroscopic measurement can be performed without using a special element such as a diffraction grating. $\Delta\lambda/\Delta t$ shown in FIG. 2 represents the magnitude of the change in wavelength with respect to the change in time, and $\Delta\lambda$ represents wavelength resolution. $\Delta t$ depends on a detection speed (signal discharge cycle) of a light receiver, and thus, in order to increase the wavelength resolution, $\Delta\lambda/\Delta t$ needs to be small (make the gradient gentle). For this purpose, it is necessary to increase the amount of stretching.

As the fiber 20 for stretching, an anomalous dispersion fiber can also be used. In this case, in the SC light, the light on the long wavelength side existing at the beginning of the pulse is delayed, and the light on the short wavelength side existing at the later time is dispersed in the traveling state. Therefore, the temporal relationship in one pulse is reversed, and pulse stretching is performed in the state where the light on the short wavelength side exists at the beginning of one pulse and the light on the longer wavelength side exists with the lapse of time. As described above, the fiber having a large absolute value of dispersion of normal dispersion or abnormal dispersion depending on the wavelength band is used.

Since a general single-mode fiber used in communication and the like exhibits normal dispersion at a wavelength of 900 to 1300 nm, a normal dispersion fiber is used in this embodiment.

In the broadband pulsed light source apparatus of the embodiment, the stretching fiber module 2 includes a multicore fiber 21, and is a module that exerts a main pulse stretching action by the multicore fiber 21. The point of adopting the multicore fiber 21 is based on the result of research by the inventors on the theme of increasing the output of the broadband pulsed light source apparatus. This point will be described below.

In pulse stretching using a fiber, there is some loss in the fiber, and it is inevitable that a loss occurs during pulse stretching. In particular, as described above, it is necessary to increase the stretching amount in order to increase the wavelength resolution, but the stretching amount depends on the fiber length, and it is necessary to lengthen the fiber in order to increase the stretching amount. However, when the fiber is lengthened, the loss increases, leading to a decrease in output and a decrease in efficiency.

Figure 3:
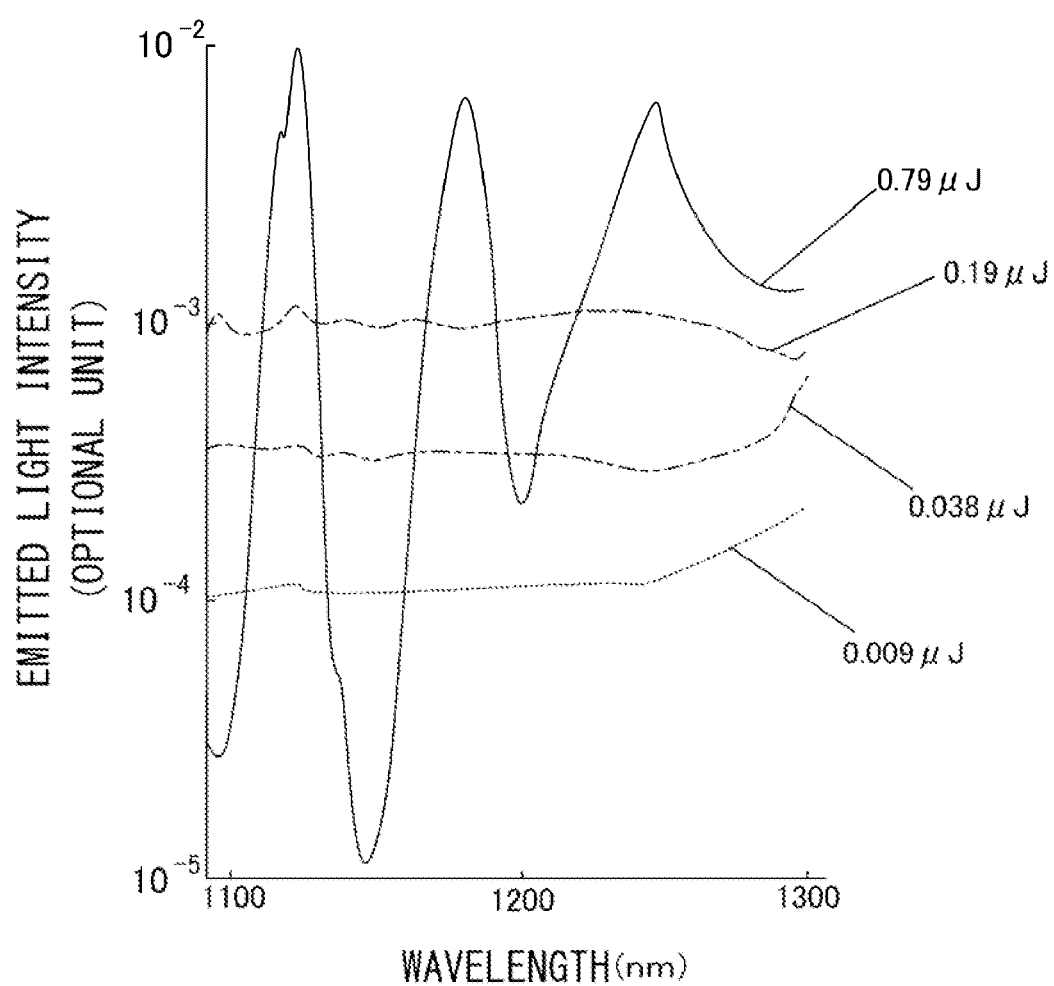
FIG. 3 is a diagram showing a result of an experiment in which an unintended nonlinear optical effect in the case of pulse-stretched high-intensity broadband pulsed light by the fiber is confirmed.

Therefore, in order to emit high-resolution broadband pulsed light with high output, it is necessary to compensate for the loss in the fiber for stretching. The first conceivable method is to increase the power of the broadband pulsed light to be input to the fiber for stretching. Based on such an idea, the inventors conducted an experiment to increase the power of the broadband pulsed light input to the fiber for stretching. As a result, it has been found that, when the power of the input broadband pulsed light increases to a certain limit or more, the wavelength characteristic of the output broadband stretched pulsed light become suddenly non-uniform, and the spectrum becomes greatly wavy. FIG. 3 is a diagram showing a result of an experiment in which this point is confirmed, and is a diagram showing a result of an experiment in which an unintended nonlinear optical effect in the case of pulse-stretched high-intensity broadband pulsed light with the fiber is confirmed. In FIG. 3, the vertical axis is a logarithmic scale.

In the experiment showing the results in FIG. 3, microchip laser light having a center wavelength of 1064 nm and a pulse width of 2 nanoseconds was incident in a photonic crystal fiber as a nonlinear element to obtain SC light, and a single-mode fiber having a length of 5 km was used to perform pulse stretching. The single-mode fiber is a normal dispersion fiber in a range of 1100 nm to 1200 nm. At this time, the energy of the incident SC light to the single-mode fiber was changed to 0.009 µJ, 0.038 µJ, 0.19 µJ, and 0.79 µJ.

As shown in FIG. 3, when the energy of the SC light is up to 0.19 µJ, there is no large variation in the emitted light intensity in the wavelength range of 1100 nm to 1200 nm, but when the energy of the SC light is 0.79 µJ, the emitted light intensity drastically fluctuates according to the wavelength. Such a variation indicates that an unintended further nonlinear optical effect has occurred in the SC light in the process of being incident on and propagating through the single-mode fiber for stretching. When such a nonlinear optical effect occurs, a new wavelength is generated at another time, so that the time wavelength uniqueness is lost. In the experiment showing the results in FIG. 3, since the pulse width of the incident SC light has not changed, it means that the peak value has been changed.

When the spectral characteristic of the broadband stretched pulsed light is a greatly wavy characteristic as shown in FIG. 3, it may be a major problem particularly in the application of spectroscopic measurement. That is, due to the relationship of the dynamic range of the wavelength, the SN ratio becomes extremely poor in the wavelength region where the light is weak, and it may be substantially unmeasurable in the wavelength region. In addition, a case where it is necessary to emit light having a flat spectral distribution for the reason of examining the optical characteristic of a certain material or the like may also be a problem.

In addition, when light is generated in a wavelength region that is not originally necessary due to an unintended nonlinear optical effect, input power is used accordingly, so that energy efficiency is reduced, and light with sufficient intensity cannot be obtained in the wavelength region that is originally necessary.

In this embodiment, in consideration of the above points, the multicore fiber 21 is adopted as the main fiber for stretching provided in the stretching fiber module 2. That is, according to the multicore fiber 21, since the power of the broadband pulsed light transmitted by one core 210 can be reduced, it is possible to prevent occurrence of an unintended nonlinear optical effect even in the case of a high-output broadband pulsed light source apparatus as a whole. Therefore, spectroscopic measurement with a high SN ratio can be performed with high efficiency over a wide wavelength region.

Figure 4:
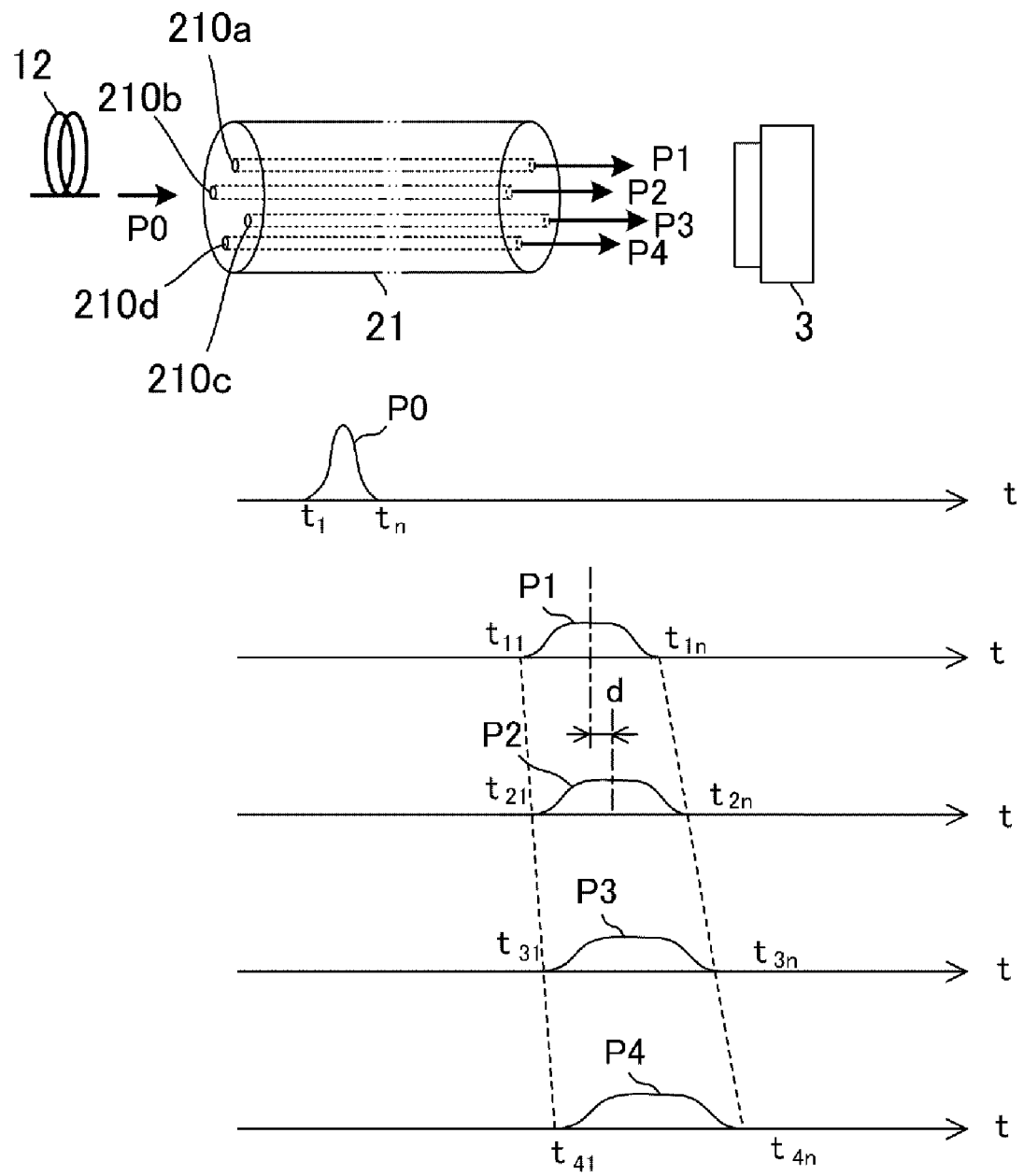
FIG. 4 is a schematic diagram showing a problem specific to pulse stretching by a multicore fiber.

Although it is beneficial to adopt the multicore fiber 21 for pulse stretching as described above, according to the research of the inventors, it has been found that a problem specific to the multicore fiber occurs. This point will be described below. FIG. 4 is a schematic diagram showing the problem specific to the pulse stretching by the multicore fiber.

The broadband pulsed light is divided into and propagates through the cores 210, and is pulse-stretched and emitted by the cores 210. The light beams emitted from the cores 210 are superimposed on each other on the irradiation surface. In this way, the power of the broadband pulsed light propagating through each core 210 is lower than that in a case where a single-core fiber is used. Therefore, an unintended nonlinear optical effect does not occur.

However, according to the research of the inventors, in the multicore fiber 21, although the cores 210 are made of the same material, the wavelength dispersion characteristics vary, and thus the conditions of pulse stretching vary among the cores. That is, as shown in FIG. 4, when the pulsed light stretched and emitted by the cores 210 are indicated by pulse waveforms (time waveforms) P1 to P4, the timings at which pulsed light beams P1 to P4 are emitted do not coincide with each other, and a shift of an amount d occurs.

In a case where the pulsed light beams P1 to P4 in which the shift occurs are multiplexed and received by the light receiver 3, as can be seen from FIGS. 2 and 4, in the time waveform of the output from the light receiver 3, the wavelengths of the light beams detected at a certain time do not coincide with each other, and the light intensities of the different wavelengths are mixed. Therefore, when such light is used for spectroscopic measurement, the accuracy of spectroscopic measurement is reduced.

Such a variation in wavelength dispersion characteristic between the cores in the multicore fiber occurs due to several factors. One is a variation in refractive index between the cores. The cores are formed of the same material, but the refractive index may be slightly different due to manufacturing factors. As is well known, the group delay of the light wave depends on the refractive index, and therefore the wavelength dispersion characteristic changes when the refractive index varies. In particular, when pulse stretching is performed, the fiber becomes longer, and thus, the variation in wavelength dispersion characteristic tends to be remarkable.

The variation in wavelength dispersion characteristic also occurs due to the variation in core diameter. The diameters of the cores are the same in design, but there are slight manufacturing variations. As is well known, the group delay is also caused by propagation of the light wave in the core, with penetrating into a clad (structural dispersion). The penetrating amount into the clad depends on the core diameter, and therefore when the core diameter varies, the wavelength dispersion characteristics also vary.

Furthermore, the wavelength dispersion characteristic of the fiber also varies depending on the situation of stress generated by external pressure applied to the fiber, such as bending or twisting. A fiber that may be long to the order of kilometers for stretching is usually used in a wound state. In this case, the situation of stress is different between the core located on the inner side and the core located on the outer side during winding, and as a result, the wavelength dispersion characteristics are also different. Further, the core diameters of the inner core and the outer core may be different due to a difference between compression and tension, and the wavelength dispersion characteristics vary accordingly.

Due to such factors, even if the cores are made of the same material as specifications and have the same length, the wavelength dispersion characteristics of the cores are not constant, and as a result, the situation of pulse stretching varies.

In this embodiment, in order to solve such problems when the multicore fiber 21 is used, the configuration in which the stretching fiber module 2 includes compensation fibers 22 is adopted. The compensation fibers 22 are coupled to the respective cores 210 of the multicore fiber 21, and compensate for a variation in wavelength dispersion characteristic between the cores of the multicore fiber 21.

The compensation fibers 22 are coupled to the respective cores 210 via a connector element 23. As the connector element 23, a fan-out device can be used. A fan-out device having an appropriate configuration such as a melt stretching type, a spatial optical type, or a planar waveguide type can be adopted as the connector element 23.

In this embodiment, single-core single-mode fibers made of the same material are used as the compensation fibers 22. The compensation fibers 22 compensate for the variation in wavelength dispersion characteristic of the cores of the multicore fiber 21, and thus have a length that realizes compensation as described later. The emission ends of the compensation fibers 22 are bundled and directed to the irradiation surface, and the beams of the emitted broadband pulsed light are superimposed on each other on the emission surface. In addition, an appropriate emission side element may be provided on the emission side of each compensation fiber 22. As the emission side element, a bundle fiber, a fan-in device, or the like may be adopted. In addition, a spatial optical element such as a lens may be provided so that light beams are radiated to the same irradiation region in a superimposed manner.

An appropriate connector element 24 is also disposed on the incident side of the multicore fiber 21. For example, as shown in FIG. 1, a configuration in which light is condensed and incident on each core using a microlens array 241 may be adopted. The light from the nonlinear element 12 of the broadband pulsed light source 1 is spread by a beam expander 242 and radiated to the microlens array 241. The microlens array 241 is an optical element in which a macrolens is disposed at a position corresponding to each core 210, and has a function of dividing and condensing light to be incident on each core 210.

In such a configuration of the first embodiment, the compensation fibers 22 compensate for the variation in wavelength dispersion characteristic between the cores of the multicore fiber 21, and thus have a length that realizes the purpose. Hereinafter, this point will be described with reference to FIG. 5. FIG. 5 is a schematic diagram showing the lengths of the compensation fibers 22.

As shown in FIG. 5, the number of the cores is set to 4, and the cores are defined as 210a, 210b, 210c, and 210d. The four compensation fibers 22 are defined as 22a, 22b, 22c, and 22d. In addition, pulses of the broadband pulsed light after being pulse-stretched in the cores 210a to 210d are defined as P1, P2, P3, and P4. A pulse of the broadband pulsed light beam before being stretched is P0. In addition, in the pulse P0 before stretching, the start of the pulse (time when the longest wavelength $\lambda_1$ exists) is $t_1$, and the end of the pulse (time when the light having the shortest wavelength $\lambda_n$ exists) is $t_n$. Similarly, in the pulses P1 to P4, the starts of the pulses are $t_{11}$, $t_{21}$, $t_{31}$, and $t_{41}$, and the ends of the pulses are $t_{1n}$, $t_{2n}$, $t_{3n}$, and $t_{4n}$ respectively.

Since a group delay occurs according to the wavelength by each of the cores 210a to 210d of the multicore fiber 21, the start $t_1$ of the pulse P0 before stretching is delayed as $t_{11}$ to $t_{41}$ in the pulses P1 to P4 after stretching, and the end $t_n$ is delayed as $t_{1n}$ to $t_{4n}$. At this time, if there is no variation in wavelength dispersion characteristic of the cores 210a to 210d, $t_{11}$ to $t_{41}$ are substantially the same time, and $t_{1n}$ to $t_{4n}$ are all the same time. However, since the wavelength dispersion characteristics vary, as shown in FIGS. 4 and 5, $t_{11}$ to $t_{41}$ are shifted, and $t_{1n}$ to $t_{4n}$ are also shifted.

Since the variation in wavelength dispersion characteristic is a variation in group delay due to a difference in wavelength, it is a variation in pulse width of the pulses P1 to P4 after stretching. However, since the variation in wavelength dispersion characteristic corresponds to the variation in group delay due to a difference in refractive index or a structural factor, the overall delay amount with respect to the pulse P0 before stretching also differs. That is, not only the pulse width but also the timing of the pulse is shifted.

In the example of FIG. 4, the group delay is the smallest in the core 210a and the group delay is largest in the core 210d, but this is merely an example of a pattern of the variation in wavelength dispersion characteristic, and there is a case where the wavelength dispersion characteristics vary in other patterns.

When the timings of the pulses P1 to P4 are shifted as a result of the variation in wavelength dispersion characteristic in this manner, each of the compensation fibers 22 has a length to compensate for the shift. That is, the first compensation fiber 22a coupled to the first core 210a has the longest length, the second compensation fiber 22b coupled to the second core 210b has the next longest length, the third compensation fiber 22c coupled to the third core 210c has the next longest length, and the fourth compensation fiber 22d coupled to the fourth core 210d has the shortest length. The difference between the lengths is selected according to the amount of the pulse shift.

When the lengths are optimized in this manner and the compensation fibers 22a to 22d are coupled, the variation in wavelength dispersion characteristic is compensated, and pulse widths and pulse timings of pulses P1' to P4' having been emitted from the compensation fibers 22a to 22d coincide with each other as shown in FIG. 5.

In practice, at the time of manufacturing the device, the pulses P1 to P4 from the cores 210a to 210d of the multicore fiber 21 are monitored with a measuring instrument such as an oscilloscope, and the compensation fibers 22 are coupled according to the amount d of each shift. Then, the pulsed light beams P1' to P4' emitted from the compensation fibers 22 are similarly observed with an oscilloscope, and it is confirmed whether the amount d of the shift is within the allowable value. If it is within the allowable value, the device is determined as pass and to be acceptable for shipment, and if it is not within the allowable value, the compensation fiber 22 is replaced and another compensation fiber 22 is coupled as appropriate so that the amount d of the shift is within the allowable value.

The allowable value of the amount of the shift will be described with reference to FIG. 6. FIG. 6 is a schematic diagram showing the allowable value of the amount of the shift of each pulse after compensation by the compensation fiber.

Whether the amount of the shift of each pulse is within the allowable value is determined using a measuring instrument such as an oscilloscope as described above, and the amount of the shift is confirmed based on a sufficiently strong point such as the center of the pulse. It may be performed at the start or the end of the pulse, but since the intensity is weak at these timings, it is difficult to accurately confirm the amount of the shift. Therefore, the comparison is performed at a point with a sufficiently high intensity such as the center of the pulse (the center of the time width) to specify the amount of the shift.

The pulse as a reference when the amount of the shift is confirmed is defined as P1, and the time at the center of the pulse P1 is defined as $t_{1m}$ as shown in FIG. 6(1). The correspondence relationship between the time and the wavelength for the pulse P1 is shown in FIG. 6(2). In the correspondence relationship, it is assumed that the wavelength corresponding to the time $t_{1m}$ is $\lambda_m$.

It is assumed that the pulse P2 has propagated through a core having a dispersion larger than that of the pulse P1. In this case, the pulse P2 is slightly delayed with respect to the pulse P1. Assuming that the time at the center of the pulse P2 is $t_{2m}$, the amount d of the shift is a difference between $t_{1m}$ and $t_{2m}$. The amount d of the shift is a time shift, and the shift of the wavelength when the amount d of the shift exists, that is, the shift of the wavelength observed at the time $t_{1m}$ is defined as $\delta\lambda$.

In this case, in the pulse P1, a wavelength of $\lambda_{m-1}$ is observed at a time earlier by $\Delta t$ from $t_{1m}$. Here, $\Delta t$ is time resolution. The wavelength of $\lambda_{m-1}$ is associated as a wavelength at an immediately preceding time from $t_{1m}$. The immediately preceding time is the photoelectric conversion intensity read at the immediately preceding timing in the signal discharge cycle in the light receiver.

If the amount d of the shift is large and the shift $\delta\lambda$ of the wavelength exceeds $\lambda_{m-1}$ as shown in FIG. 6(2), the intensity of the light having the adjacent wavelength (or the intensity of the light having the wavelength further away) is included in the intensity of the wavelength of $\lambda_m$. If $\delta\lambda$ is equal to or less than the wavelength resolution $\Delta\lambda$, it is a difference in spectral intensity that cannot be originally resolved, and thus the problem is small. However, when $\delta\lambda$ exceeds the wavelength resolution $\Delta\lambda$, the problem becomes apparent. Therefore, the amount d of the shift may be a width that is equal to or less than the wavelength resolution at the wavelength. The width being equal to or less than the wavelength resolution means that the width is equal to or less than a width that is more than the adjacent wavelength when the amount d of the shift is multiplied by $\Delta\lambda/\Delta t$.

As described above, according to the broadband pulsed light source apparatus of the embodiment, since the broadband pulsed light is divided by the multicore fiber 21 and pulse-stretched, it is possible to prevent an unintended nonlinear optical effect at the time of pulse stretching while achieving a high-output light source apparatus. Therefore, spectroscopic measurement with a high SN ratio can be performed with high efficiency over a wide wavelength region. Since the variation in wavelength dispersion characteristic of the cores is compensated by the compensation fibers 22, the uniqueness of time to wavelength is accurately maintained when the divided and pulse-stretched light beams are superimposed on each other.

In the above configuration, the compensation fibers 22 are coupled to the cores 210. However, depending on the situation of occurrence of a variation in wavelength dispersion characteristic, it may be sufficient to be coupled to only one core 210, or it may be sufficient to be coupled to only some cores 210, that is, two or more cores 210.

Figure 7:
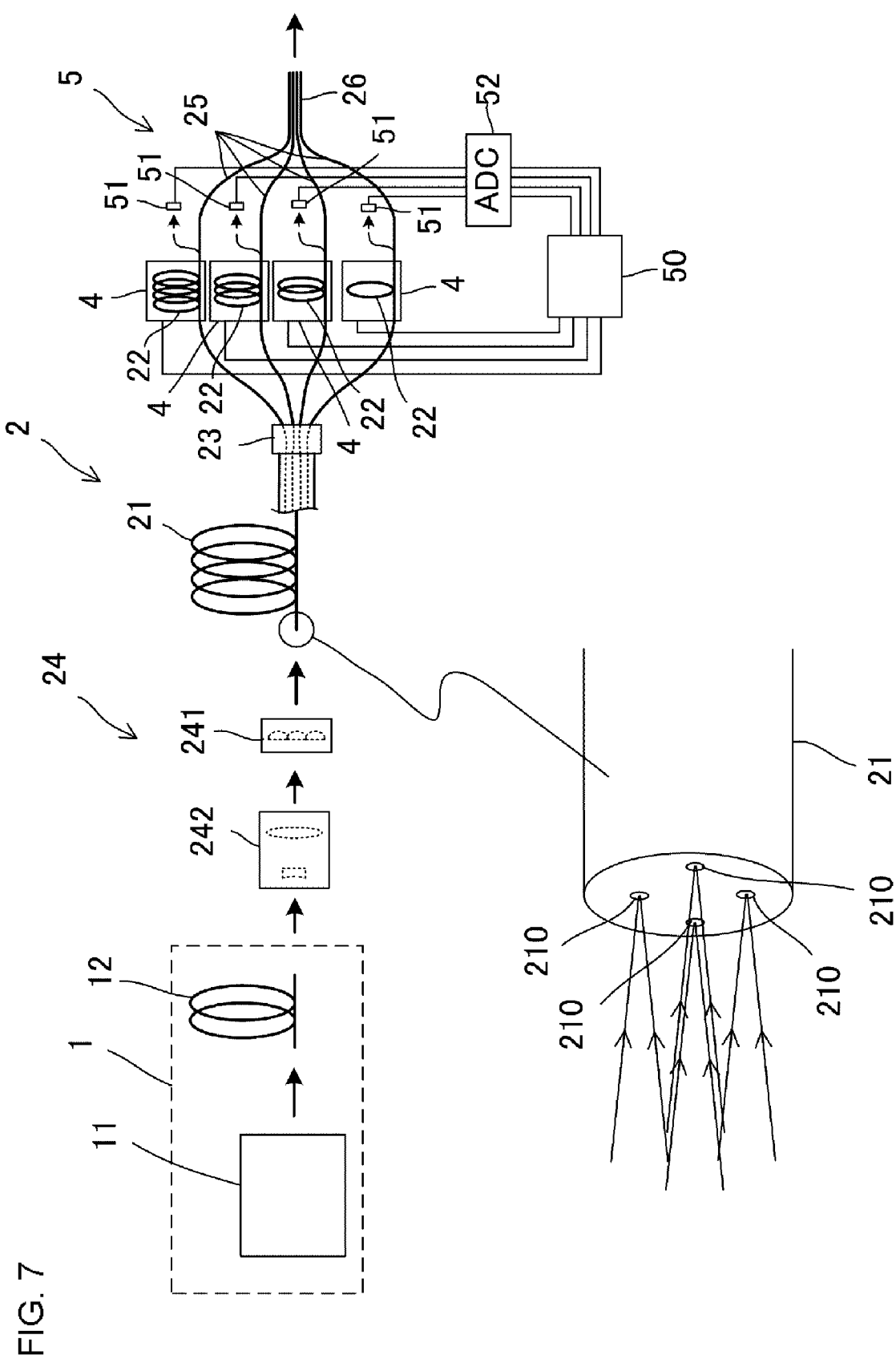
FIG. 7 is a schematic diagram of a broadband pulsed light source apparatus of a second embodiment.

Next, a broadband pulsed light source apparatus of a second embodiment will be described. FIG. 7 is a schematic diagram of the broadband pulsed light source apparatus of the second embodiment.

The broadband pulsed light source apparatus of the second embodiment is different from that of the first embodiment in that temperature adjusters 4 that each adjust the temperature of the compensation fiber 22 are provided. In this embodiment, the temperature adjusters 4 are provided to the respective compensation fibers 22, and the temperatures of the compensation fibers 22 can be adjusted independently of each other.

Each temperature adjuster 4 may use either a gas or a liquid as a heat medium. For example, it is possible to adopt a mechanism in which the compensation fiber 22 is disposed in a thermostatic chamber filled with a heat medium such as water or a purge gas to adjust the temperature of the heat medium.

In this embodiment, the operation of each temperature adjuster 4 is also optimized. That is, a monitoring unit 5 for controlling the operation of each temperature adjuster 4 is provided, and each temperature adjuster 4 operates according to a signal from the monitoring unit 5.

There are roughly two ideas about temperature adjustment. One is that when a temperature change occurs in the compensation fiber 22, a refractive index changes, and a wavelength dispersion characteristic changes. As a result, the wavelength dispersion characteristic varies with the other compensation fibers 22, and the timing of the broadband pulsed light to be emitted is shifted. In order to prevent this, the temperature of the compensation fiber 22 is detected and adjusted, and the temperature of the compensation fiber 22 is kept constant. Another idea is to adjust the temperature so as to compensate for the shift when the timing of the broadband pulsed light is shifted regardless of the temperature of the compensation fiber 22.

Even in the former idea, it is possible to emit broadband pulsed light with good uniqueness of time to wavelength, but in this embodiment, the latter idea is adopted in order to further improve the uniqueness of time to wavelength. The former idea is an idea that the wavelength dispersion characteristic is constant if the temperature is constant, but this idea cannot cope with a case where the wavelength dispersion characteristic changes regardless of the temperature. For example, in a case where a temporal change occurs in the material itself of the compensation fiber 22 and the wavelength dispersion characteristic changes, the idea cannot cope with the change. The latter idea can also cope with such a change in wavelength dispersion characteristic. Therefore, in this embodiment, as the monitoring unit 5, one that monitors the variation in wavelength dispersion characteristic of the compensation fibers 22 is adopted.

Specifically, the monitoring unit 5 receives the beams of the broadband pulsed light after being pulse-stretched by the multicore fiber 21 and each compensation fibers 22. As shown in FIG. 7, in this embodiment, the compensation fibers 22 are coupled to a bundle fiber 26 via relay fibers 25. Each of the relay fibers 25 branches halfway, and one is for irradiation and the other is for monitoring. The power branched for monitoring may be small, and may be 10% or less of the entire power.

A monitoring light receiver 51 is disposed at a position where light emitted from the branch end for monitor of each relay fiber 25 is received. As shown in FIG. 7, in this embodiment, a controller 50 that transmits a control signal to each temperature adjuster 4 is provided. Each monitoring light receiver 51 is coupled to the controller 50 via an AD converter 52.

The controller 50 incorporates a processor, processes detection data from each monitoring light receiver 51, and calculates the amount of the shift of each beam of the broadband pulsed light. In addition, the controller 50 includes a storage such as a memory, and a threshold value of the amount of the shift is stored in the storage. Further, the storage stores in advance a reference value for calculating a temperature adjustment amount when the amount of the shift exceeds the threshold value. The controller 50 is structured to calculate a temperature adjustment amount according to the set reference value, send a control signal to the temperature adjuster 4, and change the temperature by the amount.

Next, control by the controller 50 will be described. FIG. 8 is a schematic diagram showing control of the temperature adjusters in the second embodiment.

In the actual temperature adjustment, a certain compensation fiber 22 is used as a reference, and a shift in timing of another emission pulse is monitored with an emission pulse from this compensation fiber 22 as a reference. Hereinafter, the compensation fiber 22 serving as a reference is referred to as a reference fiber.

As shown in FIG. 8(1), a shift of the emission pulse P2 from the certain compensation fiber 22 from the emission pulse P1 from the reference fiber 22 is observed. For this shift, the amount d of the shift between the centers of the pulses P1 and P2 specified by the detection data is calculated. The temperature adjusters 4 are controlled such that the amount d is minimum (d=0).

Figure 9:
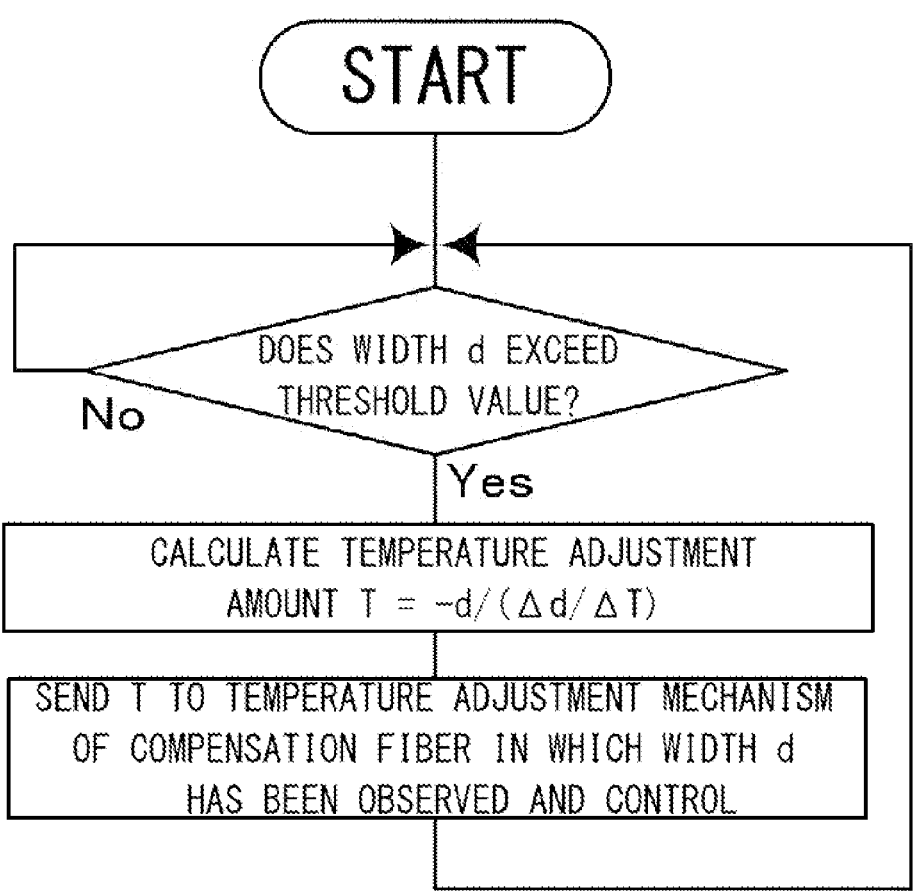
FIG. 9 is a flowchart schematically showing an example of a temperature adjustment program.

The temperature adjuster 4 may be controlled manually by an operator, or may be controlled by a program (hereinafter, referred to as a temperature adjustment program) implemented in the controller 50. FIG. 9 is a flowchart schematically showing an example of the temperature adjustment program.

The storage of the controller 50 stores a reference value for eliminating the shift. The reference value is a reference value indicating how much temperature is changed to shift the timing of the emission pulse, and is experimentally obtained and stored in advance.

Specifically, as the temperature increases, the refractive index decreases, and as the refractive index decreases, the wavelength dispersion increases. Therefore, the timing of the broadband pulsed light is delayed. Conversely, as the temperature decreases, the refractive index increases and the wavelength dispersion decreases. Therefore, the timing of the broadband pulsed light is advanced. Therefore, when the timing of the emission of the broadband stretched pulsed light is represented with a certain time as 0, the timing is schematically as shown in FIG. 8(2).

An amount $\Delta d$ of the shift in timing with respect to the temperature change $\Delta T$ can be experimentally examined. In this embodiment, $\Delta d/\Delta T$ is checked in advance for each compensation fiber 22, and this value is stored in the storage of the controller 50.

As shown in FIG. 9, when the amount d of the shift exceeds the threshold value, the temperature adjustment program calculates a temperature adjustment amount T for eliminating the amount d of the shift. That is, $T=-d/(\Delta d/\Delta T)$ is calculated, and the temperature adjustment amount T is sent to the temperature adjuster 4 of the compensation fiber 22 in which the amount d of the shift has been observed. The temperature adjuster 4 adjusts the temperature so that the temperature of the compensation fiber 22 rises or falls by the temperature adjustment amount T. The temperature adjustment program is programmed and implemented in the controller 50 such that the temperature adjuster 4 performs such temperature adjustment.

The above control example is an example in which temperature adjustment is performed when the amount d of the shift exceeds the threshold value, but feedback control such as PID control may be performed. That is, feedback control for achieving d=0 may be performed to improve immediacy.

According to the broadband pulsed light source apparatus of the second embodiment, since the variation in wavelength dispersion characteristic of the compensation fibers 22 are suppressed by the temperature adjustment, even when the wavelength dispersion characteristic changes due to a change in the use environment or a change in the characteristic of the fiber material itself, the shift in timing of each beam of the emitted broadband pulsed light is suppressed to be small. Therefore, the uniqueness of time to wavelength is high and is stably maintained, and a broadband pulsed light source apparatus with high reliability is obtained.

In the temperature adjustment, the threshold value of the amount d of the shift can be set to be the same as the amount d of the shift in the first embodiment. That is, in a case where the amount d of the shift is grasped at the center of the pulse width (time width), the amount d is a time width equal to or less than the wavelength resolution at the wavelength corresponding to the time at the center. When the width is exceeded, the temperature is adjusted as described above.

As the control of the temperature adjuster 4, the temperature of each compensation fiber 22 may be detected by a sensor, and control may be performed so that the temperature becomes constant. Even in this case, since the variation in wavelength dispersion characteristic due to the temperature change and the variation in timing of the emission of the broadband pulsed light are suppressed, the accuracy of the uniqueness of time to wavelength is improved.

In the second embodiment, the temperature adjuster 4 is provided for each compensation fiber 22, and the temperature is adjusted independently. Therefore, it is possible to finely adjust the temperature, and it is possible to finely suppress the variation in wavelength dispersion characteristic. Therefore, the uniqueness of time to wavelength is maintained with higher accuracy. The temperature adjuster 4 may be a mechanism that collectively adjusts the temperatures of the plurality of compensation fibers 22. In this case, there is given an effect of being capable of suppressing a change (temporal variation) in wavelength dispersion characteristic due to a temperature change for the plurality of compensation fibers 22.

In addition, in the second embodiment, the point that the temperature adjuster 4 operates when the amount d of the shift in timing of emission of the broadband pulsed light exceeds the threshold value has a significance of minimizing the operation of the temperature adjuster 4. This point has an effect of enhancing energy saving performance of the device.

There is an effect that the temperature adjustment is not insufficient or excessive in the point that the temperature adjustment is performed by calculating the temperature adjustment amount according to the reference value obtained in advance. Regarding the temperature adjustment, there is a method of continuing the temperature rise (heating) and stopping it when the amount d of the shift becomes equal to or less than the threshold value, or a method of continuing the temperature drop (cooling) and stopping it when the amount d of the shift becomes equal to or less than the threshold value. However, in this way, there may be a problem that the temperature adjustment is temporarily insufficient or excessive. Such a problem does not occur in the configuration of the above embodiment.

Figure 10:
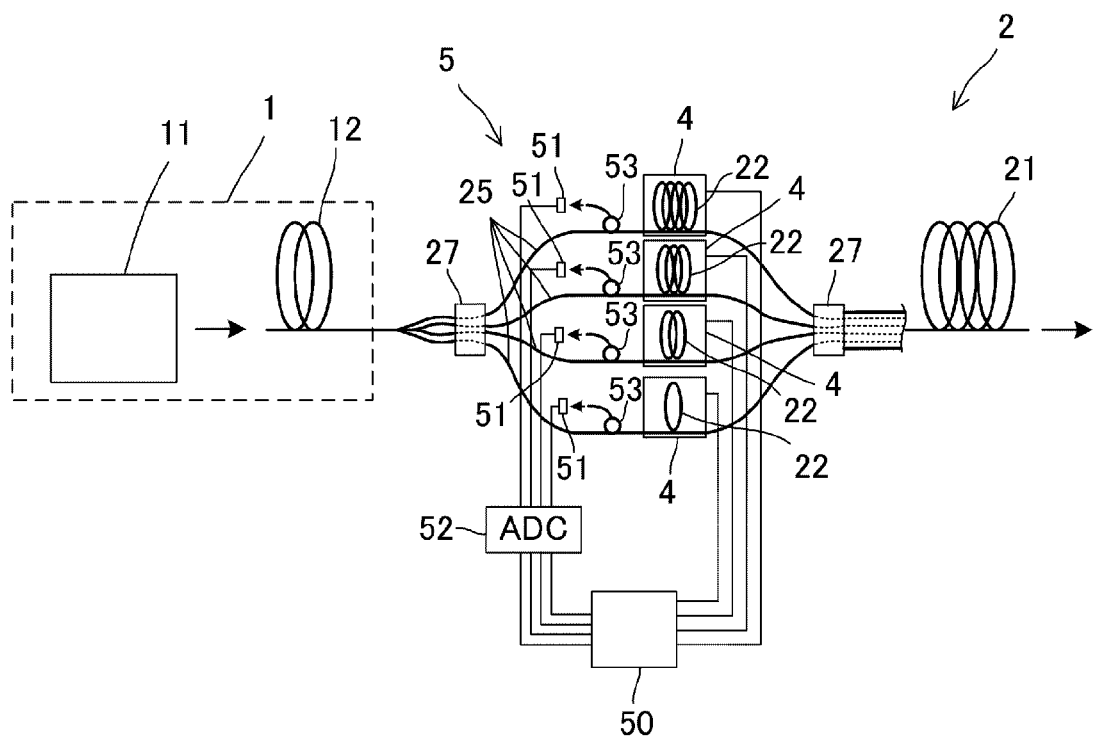
FIG. 10 is a schematic diagram of a broadband pulsed light source apparatus of a third embodiment.

Next, a broadband pulsed light source apparatus of a third embodiment will be described. FIG. 10 is a schematic diagram of the broadband pulsed light source apparatus of the third embodiment.

Also in the third embodiment, the stretching fiber module 2 includes the multicore fiber 21 and the compensation fibers 22, and the compensation fibers 22 compensate for a variation in wavelength dispersion characteristic between the cores of the multicore fiber 21. The temperature adjuster 4 is attached to each compensation fiber 22, and the controller 50 that controls each temperature adjuster 4 is provided.

As shown in FIG. 10, in the third embodiment, the compensation fibers 22 are disposed on the incident side of the multicore fiber 21, and the arrangement positions thereof are opposite to those in the first and second embodiments. Since the wavelength dispersion is determined by the length of the entire transmission path, such an arrangement is equivalent as an effect. The fiber as the nonlinear element 12 in the broadband pulsed light source 1 is a fiber whose emission end is branched. The number of the branches is equal to the number of the cores of the multicore fiber 21. The emission ends of the fiber as the nonlinear element 12 are coupled to the cores 210 of the multicore fiber 21 via a connector element 27, the relay fibers 25, and another connector element 27.

Also in this embodiment, the monitoring unit 5 that monitors the status of pulse stretching in the stretching fiber module 2 is provided, but as shown in FIG. 10, each monitoring unit 5 is structured to extract light on the incident side of each compensation fiber 22. That is, each monitoring unit 5 extracts the light reflected and returned at the emission end of the multicore fiber 21 and detects the timing of the pulse.

Specifically, as shown in FIG. 10, an optical circulator 53 is disposed as a branching element on each relay fiber 25. A monitoring fiber (reference numeral is omitted) is coupled to each optical circulator 53, and the monitoring light receiver 51 is disposed at a position facing an emission end of each monitoring fiber. Each monitoring light receiver 51 is similarly coupled to the controller 50 via the AD converter 52.

In the beams of the broadband pulsed light propagated through each core 210 of the multicore fiber 21, most of the light beams are emitted from the emission end and radiated to the irradiation surface, but part of the light beams is reflected back at the emission end. The reflected light returns from each core of the multicore fiber 21 through each compensation fiber 22, is extracted by the optical circulator 53 on each relay fiber 25, and is detected by each monitoring light receiver 51.

Also in this embodiment, the detection data from each monitoring light receiver 51 is processed to calculate the amount d of the shift in timing of each pulse, and when the amount d of the shift exceeds the threshold value, the temperature adjuster 4 of the compensation fiber 22 that exceeds the threshold value operates. Therefore, the amount d of the shift is suppressed to be equal to or less than the threshold value, and the broadband pulsed light in which the uniqueness of time to wavelength is maintained high is emitted.

In this embodiment, since each monitoring unit detects the light reflected and returned at the emission end of the multicore fiber 21, the overall wavelength dispersion is doubled, and thus the amount d of the shift is also doubled. Therefore, the amount d of the calculated shift is multiplied by ½ and compared with the threshold value, or the threshold value is doubled and then compared with the threshold value.

Figure 11:
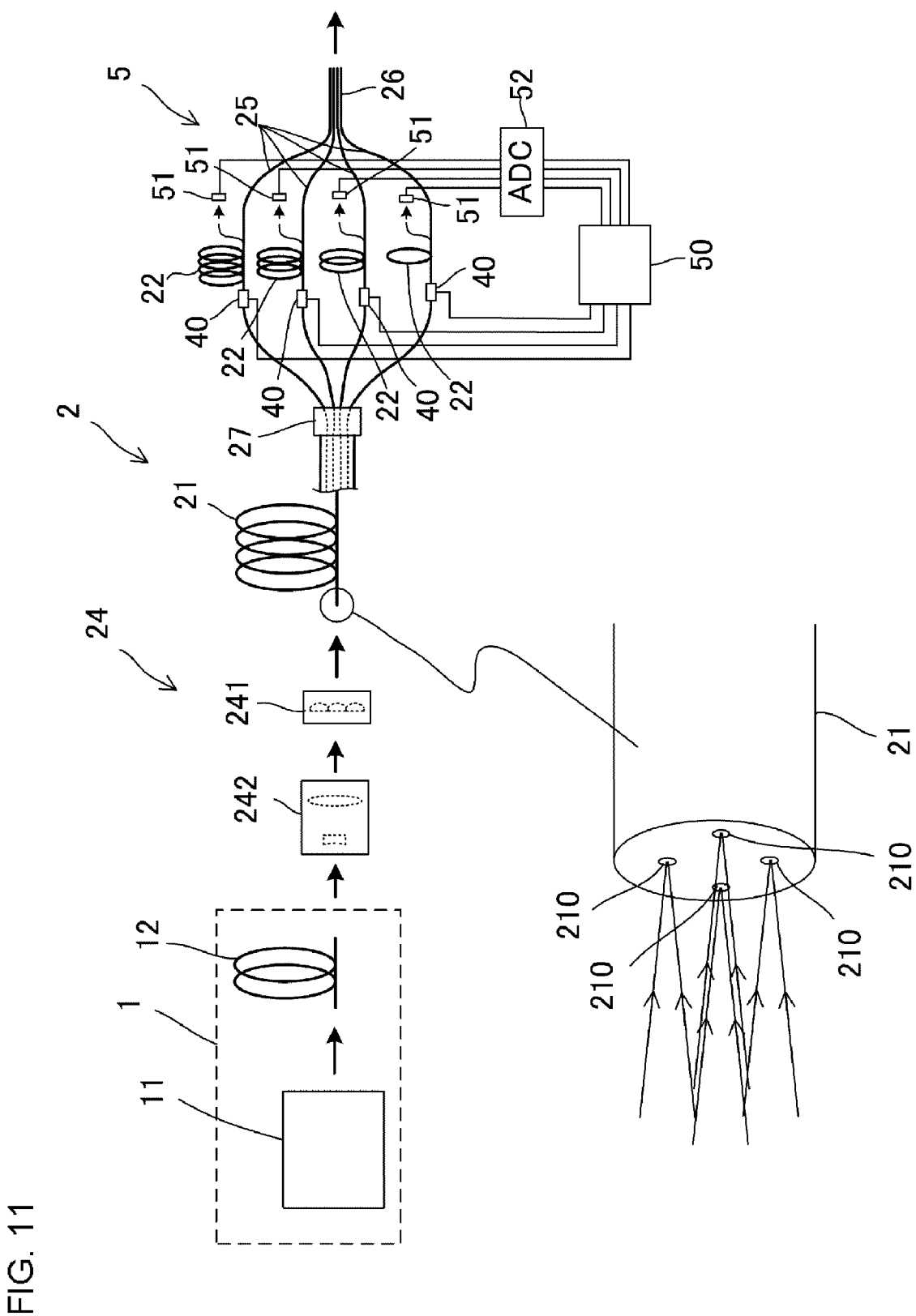
FIG. 11 is a schematic diagram of a broadband pulsed light source apparatus of a fourth embodiment.

Next, a broadband pulsed light source apparatus of a fourth embodiment will be described. FIG. 11 is a schematic diagram of the broadband pulsed light source apparatus of the fourth embodiment.

Also in the fourth embodiment, the stretching fiber module 2 includes the multicore fiber 21 and the compensation fibers 22, and the compensation fibers 22 compensate for a variation in wavelength dispersion characteristic between the cores of the multicore fiber 21.

In this embodiment, each compensation fiber 22 is provided with a length adjustment mechanism 40. As the length adjustment mechanism 40, for example, a mechanism that adjusts the length by extending and contracting the compensation fiber 22 by a piezoelectric element can be adopted.

Also in this embodiment, the monitoring unit 5 that detects the shift in timing of emission of the broadband pulsed light emitted from each compensation fiber 22 is provided. The shift detected by the monitoring unit 5 is input to the controller 50, and the controller controls each length adjustment mechanism 40 according to the shift. That is, in a case where the amount of the shift exceeds the threshold value, the length adjustment mechanism 40 operates. Then, a certain compensation fiber 22 is used as a reference, and the compensation fiber 22 which emits its output at a timing earlier than the reference is extended by the length adjustment mechanism 40 to increase the optical path length, and the compensation fiber 22 which emits its output at a timing later than the reference is contracted to decrease the optical path length. By adjusting the optical path length, the wavelength dispersion becomes uniform as a whole, and each beam of the broadband pulsed light is emitted at a timing without a shift.

Also in this case, the controller 50 checks in advance the relationship between the length change amount and the amount of the shift of each compensation fiber 22, and stores the relationship as a reference value in the storage in the controller 50. The processor included in the controller 50 determines the length adjustment amount of each compensation fiber 22 according to the reference value, and operates each length adjustment mechanism 40.

Also in this embodiment, the shift in timing of emission of each beam of the broadband pulsed light is suppressed to be equal to or less than the threshold value. Therefore, the broadband pulsed light in which the uniqueness of time to wavelength is maintained high is emitted.

As compared with the case of using the temperature adjuster 4, in the case of the length adjustment mechanism 40 (mechanical adjustment of the optical path length), the adjustment of the wavelength dispersion amount can be performed with good responsiveness, so that it is excellent in terms of the high-speed operation of suppressing the variation in wavelength dispersion characteristic.

Figure 12:
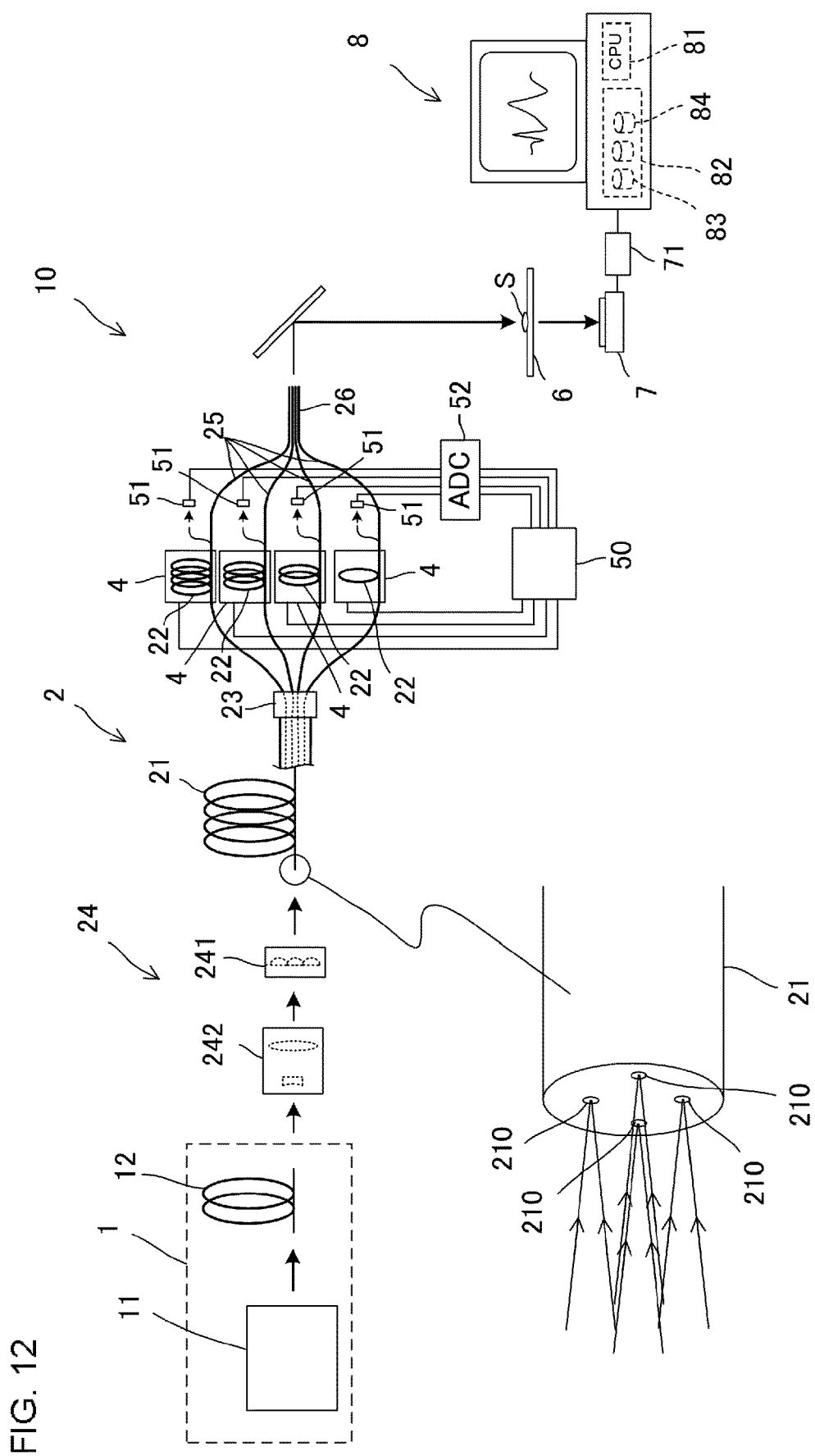
FIG. 12 is a schematic diagram of a spectroscopic measurement apparatus of an embodiment.

Next, embodiments of the inventions of a spectroscopic measurement apparatus and a spectroscopic measurement method using such a broadband pulsed light source apparatus will be described. FIG. 12 is a schematic diagram of the spectroscopic measurement apparatus of the embodiment.

The spectroscopic measurement apparatus shown in FIG. 12 includes a broadband pulsed light source apparatus 10, a light receiver 7 disposed at a light receiving position of light from an object S irradiated with broadband pulsed light from the broadband pulsed light source apparatus 10, and a calculator 8 that processes an output from the light receiver 7.

The broadband pulsed light source apparatus 10 of the second embodiment described above is used, but it is a matter of course that the broadband pulsed light source apparatus of the first embodiment or the broadband pulsed light source apparatuses of the third and fourth embodiments may be used. In this embodiment, since it is assumed that transmission spectrum of the object S is measured, the object S is disposed on a transparent receiving plate 6. Since the measurement wavelength band is in the near-infrared range of about 900 nm to 1300 nm, the receiving plate 6 made of a material having good transmittance in this band is used.

The light receiver 7 is disposed on the light emission side of the receiving plate 6. As the light receiver 7, a photodiode is used. A high-speed photodiode of about 1 GHz to 10 GHz can be suitably used.

As the calculator 8, a general-purpose PC including a processor 81 and a storage 82 can be used. Spectroscopic measurement software is installed in the storage 82, and includes a measurement program 83 including a code for converting a temporal change of an output from the light receiver 7 into a spectrum, reference spectrum data 84 used when calculating the spectrum, and the like. An AD converter 71 is provided between the light receiver 7 and the general-purpose PC, and an output of the light receiver 7 is converted into digital data by the AD converter 71 and input to the general-purpose PC.

FIG. 13 is a schematic diagram showing a configuration of the measurement program included in the spectroscopic measurement software. The example of FIG. 13 is an example of a configuration for measuring an absorption spectrum (spectral absorption rate). The reference spectrum data 84 is a value for each wavelength serving as a reference for calculating the absorption spectrum. The reference spectrum data 84 is acquired by causing the light from the broadband pulsed light source apparatus 10 to be incident on the light receiver 7 without passing through the object S. That is, the light is directly incident on the light receiver 7 without passing through the object S, the output of the light receiver 7 is input to the general-purpose PC via the AD converter 71, and a value for each time resolution $\Delta t$ is acquired. Each value is stored as a reference intensity at each time ($t_1, t_2, t_3, \ldots$, hereinafter referred to as an intra-pulse time) for each $\Delta t$ in the pulse ($V_1, V_2, V_3, \ldots$).

The reference intensities $V_1, V_2, V_3, \ldots$ at the intra-pulse times $t_1, t_2, t_3, \ldots$ are intensities (spectra) of the corresponding wavelengths $\lambda_1, \lambda_2, \lambda_3, \ldots$. The relationships between the intra-pulse times $t_1, t_2, t_3, \ldots$ and the wavelengths are examined in advance, and it is handled that the values $V_1, V_2, V_3, \ldots$ at the intra-pulse times are values of $\lambda_1, \lambda_2, \lambda_3, \ldots$.

Then, when the light having passed through the object, that is, the transmitted light through the object is incident on the light receiver 7, the output from the light receiver 7 similarly passes through the AD converter 71 and is stored in the memory as the value (measurement value) of each of the intra-pulse times $t_1, t_2, t_3, \ldots$ ($v_1, v_2, v_3, \ldots$). Each measurement value is compared with the reference spectrum data 84 ($v_1/V_1, v_2/V_2, v_3/V_3, \ldots$). Then, the logarithm of the inverse is taken as necessary, and used as the calculation result of the absorption spectrum.

The measurement program 83 is programmed so as to perform the arithmetic processing as described above. In the example of FIG. 13, only the absorption spectrum is examined, but actually, by examining the absorption spectrum, the ratio of the components of the object may be analyzed or the object may be identified.

Next, the operation of the spectroscopic measurement apparatus will be described. The following description is also a description of embodiments of the spectroscopic measurement method. In the case of performing spectroscopic measurement using the spectroscopic measurement apparatus of the embodiment, the broadband pulsed light source apparatus 10 is operated in a state where the object S is not disposed, and the output data from the light receiver 7 is processed to acquire the reference spectrum data 84 in advance. Then, the object S is disposed on a receiving plate 6, and the broadband pulsed light source apparatus 10 is operated again. Then, the output data from the light receiver 7 is input to the calculator 8 via the AD converter 71, and converted into a spectrum by the measurement program 83 to calculate the absorption spectrum.

According to the spectroscopic measurement apparatus or the spectroscopic measurement method as described above, since the broadband pulsed light source apparatus 10 in which an unintended nonlinear optical effect does not occur in the stretching fiber module 2 is used, spectroscopic measurement can be performed with light in which the uniqueness of time to wavelength is maintained high. Therefore, the accuracy of spectroscopic measurement is enhanced. In addition, there is no problem that the SN ratio decreases in a specific wavelength region due to the dynamic range. Furthermore, since the light can be radiated with high energy efficiency, there is also an advantage that an object having a large amount of light absorption can be measured with the transmitted light intensity increased.

In addition, since the compensation fibers 22 compensate for the variation in wavelength dispersion characteristic between the cores of the multicore fiber 21 in the stretching fiber module 2, the accuracy of the uniqueness of time to wavelength is further improved. For this reason, the accuracy of spectroscopic measurement is also improved in this respect.

Although the spectroscopic measurement of the transmitted light through the object S has been described as an example in the above description, it is also possible to provide the light receiver 7 at a position where reflected light from the object S is received and perform spectroscopic measurement of the reflected light from the object S, and in this case, a similar effect can be obtained. Furthermore, scattered light or fluorescence from the object S irradiated with the broadband pulsed light may be captured and the spectrum of the object S is measured. Therefore, the light from the object S may be transmitted light, reflected light, fluorescence, scattered light, or the like from the object S irradiated with light.

The broadband pulsed light source apparatus of each embodiment described above can also be applied to a microscope technique such as a nonlinear optical microscope in addition to spectroscopic measurement. In addition, as the broadband pulsed light source 1, in addition to one that emits SC light, an amplified spontaneous emission (ASE) light source, a superluminescent diode (SLD) light source, or the like may be adopted. Since the ASE light source is light generated in the fiber, affinity with the fiber is high, and it is possible to cause broadband pulsed light to be incident on the stretching fiber module 2 with low loss, so that a high-efficiency broadband pulsed light source apparatus can be constituted. In addition, since also the SLD light source extracts light emission in a narrow active layer, it is possible to cause light to be incident on the stretching fiber module 2 with low loss, so that a high-efficiency broadband pulsed light source apparatus can be constituted.

In each of the above embodiments, a bundle fiber may be used instead of the multicore fiber 21. As the bundle fiber, a bundle fiber having a structure in which a plurality of single-core single-mode fibers are bundled is adopted. Although a bundle in which only two fibers are bundled is theoretically effective, a bundle in which about two to seven fibers are bundled can be used. The material may be a silica-based material, a fluorine-based material, or the like, and a material having a small loss in the wavelength band of the broadband pulsed light is suitably used. As a method of bundling, melting (fusion) may be used in addition to bonding.

For connection with a fiber as the nonlinear element 12, a molten branched fiber can be used other than a spatial optical fan-in device. For example, a configuration is conceivable in which an emission end of the fiber as the nonlinear element 12 is branched into multiple fibers, and the branched multiple fibers are coupled to the bundle fiber.

Since the bundle fiber can be obtained at a lower cost than the multicore fiber, there is an advantage in terms of cost. On the other hand, the multicore fiber is structurally more compact than the bundle fiber, and there is an advantage that the multicore fiber is not as bulky as the bundle fiber when looped. In addition, the loss (the amount of light not incident on the core) at the incident end surface is often smaller in the multicore fiber than in the bundle fiber, and the multicore fiber is also excellent in efficiency.

The invention claimed is:

1. A broadband pulsed light source apparatus comprising:
   a broadband pulsed light source; and
   a stretching fiber module structured to stretch a pulse width of the broadband pulsed light from the broadband pulsed light source such that a time and a wavelength of the light in a pulse have a one-to-one relationship,
   wherein the stretching fiber module includes:
   a multicore fiber or a bundle fiber; and
   compensation fibers that are single-core fibers, and
   wherein the compensation fibers are coupled to cores of the multicore fiber or fibers of the bundle fiber, and compensate for a variation in wavelength dispersion characteristic among the cores of the multicore fiber or among the fibers of the bundle fiber.

2. The broadband pulsed light source apparatus according to claim 1, further comprising a temperature adjuster structured to adjust a temperature of each of the compensation fibers.

3. The broadband pulsed light source apparatus according to claim 2, further comprising a monitoring unit structured to detect a shift in timing of emission of the broadband pulsed light emitted from each of the compensation fibers,
   wherein the temperature adjuster is structured to perform temperature adjustment according to an amount of the shift in timing detected by the monitoring unit.

4. The broadband pulsed light source apparatus according to claim 3, wherein the temperature adjuster is structured to operate when the amount of the shift in timing of emission of the broadband pulsed light emitted from each of the compensation fibers is equal to or more than a threshold value.

5. The broadband pulsed light source apparatus according to claim 3, wherein the temperature adjuster is structured to perform temperature adjustment by an amount determined in advance according to the amount of the shift in timing of emission of the broadband pulsed light emitted from each of the compensation fibers.

6. The broadband pulsed light source apparatus according to claim 1, further comprising a length adjustment mechanism structured to adjust a length of each of the compensation fibers.

7. The broadband pulsed light source apparatus according to claim 1, wherein the stretching fiber module includes the multicore fiber and the compensation fibers that are single-core fibers, and the multicore fiber is a single-mode multicore fiber.

8. The broadband pulsed light source apparatus according to claim 1, wherein the stretching fiber module includes the bundle fiber and the compensation fibers that are single-core fibers, and the bundle fiber is a fiber in which single-mode fibers are bundled.

9. The broadband pulsed light source apparatus according to claim 1, wherein the compensation fibers are single-mode fibers.

10. A spectroscopic measurement apparatus comprising:
    the broadband pulsed light source apparatus according to claim 1;
    a light receiver disposed at a position where light from an object irradiated with broadband pulsed light emitted from the broadband pulsed light source apparatus is incident; and
    a calculator structured to perform calculation of converting output data from the light receiver into a spectrum.

11. A spectroscopic measurement method comprising:
    irradiating an object with broadband pulsed light emitted from the broadband pulsed light source apparatus according to claim 1;
    receiving, by a light receiver, light from the object irradiated with the light; and
    converting output data from the light receiver into a spectrum by a calculator.

* * * * *